US005695588A

United States Patent [19]

Daems et al.

[11] Patent Number: 5,695,588

[45] Date of Patent: Dec. 9, 1997

[54] METHOD FOR APPLYING AN INK-RECEIVING LAYER TO ANY GIVEN SUBSTRACE

[75] Inventors: Eddie Daems, Herentals; Guido Desie, Herent; Eric Verschueren, Merksplas; Luc Leenders, Herentals, all of Belgium

[73] Assignee: Agfa-Gevaert, Mortsel, Belgium

[21] Appl. No.: 782,501

[22] Filed: Jan. 10, 1997

Related U.S. Application Data

[62] Division of Ser. No. 316,243, Sep. 30, 1994.

[30] Foreign Application Priority Data

Oct. 15, 1993 [EP] European Pat. Off. .............. 93202900

[51] Int. Cl.$^{6}$ ...................................................... B32B 31/00

[52] U.S. Cl. .......................... 156/247; 156/230; 156/277; 156/540; 428/352; 428/914

[58] Field of Search .................................... 156/230, 237, 156/238, 247, 277, 540; 428/352, 354, 914; 430/213

[56] References Cited

U.S. PATENT DOCUMENTS

| | | | |
|---|---|---|---|
| 4,033,770 | 7/1977 | De Haes et al. | 156/230 X |
| 4,820,608 | 4/1989 | Claeys et al. | 430/213 |
| 5,135,798 | 8/1992 | Muschter et al. | 156/230 X |
| 5,198,306 | 3/1993 | Kruse | 428/481 |

*Primary Examiner*—James Engel
*Attorney, Agent, or Firm*—Brumbaugh, Graves, Donohue & Raymond

[57] ABSTRACT

A method for applying an ink-receiving layer to any given substrate comprising the steps of laminating a sheet or web material comprising at least three layers which include a temporary support having a thickness between 40 and 100 μm, an ink-receiving layer and an adhesive layer onto said given substrate, and stripping the temporary support away to free the ink-receiving layer. The ink-receiving layer, according to the present invention, is adapted to be used with water-based inks and enables the end-user of said image-recording member to transfer that ink-receiving layer to any one of the substrates of his choice.

3 Claims, No Drawings

METHOD FOR APPLYING AN INK-RECEIVING LAYER TO ANY GIVEN SUBSTRACE

This is a divisional of copending application Ser. No. 08/316,243, filed on Sep. 30, 1994, pending.

FIELD OF THE INVENTION

This invention relates to a method for ink-jet printing of materials. More particularly the present invention relates to a method to provide any given substrate with an ink-receiving layer as normally used in ink-jet printing.

BACKGROUND OF THE INVENTION

Ink-jet printing has become a popular printing technique because of its convenience, simplicity and low cost. Especially in those instances where a limited edition of the printed matter is needed, ink-jet printing has become a printing technology of choice.

In the ink jet printing technique the individual ink droplets can be applied to the receiving substrate in several different ways. The ink solution can be jetted continuously through a small nozzle towards the receiving layer (Hertz method). The ink droplet can also be created "upon demand" by a piezoelectric transducer or a thermal push (Bubble Jet).

Ink-jet printing can be used both on plain paper substrates and on (transparent) polymeric substrates.

Applying ink-jet printing techniques on plain paper can be achieved with cheap water soluble or water-based inks since these inks are readily dried on the plain paper substrate.

An other application of ink-jet printing lies in the production of transparencies on a transparent polymeric substrate. These elements are primarily intended for use on an overhead projector. More generally, these elements can be used for all kinds of viewing means by transmitted light.

Such transparencies can be made by ink-jet printing on a plain polymeric substrate when using a hot-melt ink-jet printing technique. By this technique a high viscosity ink is melt and jetted upon the plain polymer substrate. There the ink readily cools down, solidifies and adheres well to the substrate. This technique however presents some disadvantages: the solidified ink yields small lenses upon the surface of the transparencies which can lead to colour changes during projection with directed light. The surface irregularities can also lead to scratching and damaging of the information contained in the transparencies.

These drawbacks are overcome by coating an ink-receiving layer, that can be printed with a water-based ink, on to the polymeric substrate.

Ink-receiving layers used in image-recording members comprising a polymeric substrate meeting the necessary different stringent requirements for high quality ink-jet printing are disclosed in e.g. German Patent Application DE 2,234,823, U.S. Pat. No. 3,889,270, U.S. Pat. No. 4,503,111, U.S. Pat. No. 3,357,846, U.S. Pat. No. 3,889,270, DE 2,925,769, GB 2,050,866, U.S. Pat. No. 4,474,850, U.S. Pat. No. 4,547,405, U.S. Pat. No. 4,578,285, WO 88 06532, U.S. Pat. No. 4,849,286, EP 339 604, EP 400 681, EP 407 881, EP 411 638 and U.S. Pat. No. 5,045,864.

Image-recording members comprising an ink-receiving layer according to any of the disclosures mentionned above can advantageously be used in ink-jet printing, but still present the drawback that ink-jet printing is only possible on the substrate provided by the manufacturer of the image recording member.

There are however circumstances where the customer is interested in ink-jet printing on a substrate of his choice. E.g. when a limited edition of information has to be printed on a substrate already carrying information that has been printed in a larger edition. This can be the case when a chain of stores prints the information concerning all stores in a large edition and the individual store manager wishes to print information concerning his particular store on the substrate already carrying the general information.

The texture, color etc. of image-recording members for use in ink-jet printing has up until now been determined by the manufacturer of the image-recording member and the end-user had to accomodate his uses to what was offered on the market place.

It is clear that there is still a need for a method that enables the end-user of an ink-jet printing technique to fix an ink-receiving layer to any substrate of his choice.

OBJECT AND SUMMARY OF THE INVENTION

It is an object of the present invention to provide a method that enables the user of an ink-jet printing technique to apply an ink-receiving layer to any of the substrates of his choice.

It is another object of the present invention to provide a method that enables the user of an ink-jet printing technique to apply an ink-receiving layer to any of the substrates of his choice and that keeps the qualities of the ink-receiving intact even after the transfer to another substrate.

It is further object of the present invention to provide a method that enables the user of an ink-jet printing technique to apply an ink-receiving layer to any of the substrates of his choice even when the final substrate is not flat or without masking an eventual relief pattern that is present on the substrate of his choice.

It is another object of the present invention to provide a sheet or web material, comprising an ink-receiving layer that is adapted to be used with water-based inks and that enables the end-user of said web or sheet material to transfer that said ink-receiving layer to any of the substrates of his choice.

Other objects and advantages of the present invention will become apparent from the description hereinafter.

The objects of the present invention are realized by providing a method for applying an ink-receiving layer to any given substrate comprising the steps of i. laminating a sheet or web material comprising at least three layers, viz. in consecutive order, a temporary support that has a thickness between 40 and 100 μm, an ink-receiving layer and an adhesive layer onto said given substrate via said adhesive layer ii. stripping the temporary support away to free said ink-receiving layer.

In a preferred embodiment of the present invention step i. of said method is carried out with a sheet or web material of which the temporary support is a polyethyleneterephthalate film. In a more preferred embodiment said temporary support is a polyethyleneterephthalate film with a thickness between 50 and 70 μm.

In a further preferred embodiment of the present invention the web or sheet material to be used in step i. of said method comprises a stripping layer between said temporary support and said ink-receiving layer.

In a further preferred embodiment the web or sheet material to be used in step i. of said method comprises an ink-receiving layer coated from a solution of a non-cellulosic binder of which the pH is adjusted between 7.5 and 11.

In another preferred embodiment the web or sheet material to be used in step i. of said method comprises an ink-receiving layer that comprises a mordanting agent.

DETAILED DESCRIPTION OF THE INVENTION

The end-user, who wishes to print any substrate with an ink-jet printing system and water-based inks, laminates a sheet or web material comprising at least three layers, viz. a temporary support, an ink-receiving layer and an adhesive layer with the adhesive layer onto the final substrate of his choice, strips away the temporary support to get a final substrate (with the form, colour, texture etc. of his choice) covered with an ink-receiving layer that enables printing in an ink-jet printing system with a water-based ink.

The composition of said three components of said sheet or web material has to be adjusted one to another so has to enable:

- easy lamination of the adhesive layer comprised in said sheet or web material member to the final substrate without influence on the ink-receiving layer.
- easy stripping of the temporary support comprised in said sheet or web material member without leaving any traces of said temporary support on to the now exposed surface of said ink-receiving layer.
- good printability in ink-jet printing of said ink-receiving layer with a water-based ink. Good printability means inter alia a high ink absorbing capacity, a high ink absorbing speed (short ink drying time), good resistance regarding waterfastness, lightfastness and indoor-discoloration.

The Temporary Support

The temporary support for use according to this invention can be any polymeric support known and commonly employed in the art. They include, e.g. those supports used in the manufacture of photographic films including cellulose triacetate, cellulose acetate propionate or cellulose acetate butyrate, polyesters such as poly(ethyleneterephthalate), polyamides, polycarbonates, polyimides, polyolefins, poly (vinyl acetals), polyethers and polysulfonamides.

Polyester film supports and especially poly(ethylene terephthalate) are preferred as temporary support for the image-recording member according to the present invention, because of their excellent properties of dimensional stability.

Since an object of the present invention is to provide the end-user with a sheet or web material comprising at least three layers, viz. a temporary support, an ink-receiving layer and an adhesive layer which enables the end-user to transfer said ink-receiving layer to any of the substrates of his choice even when the final substrate is not flat, it is preferred that said temporary support be as flexible as possible without loosing on dimensional stability. It is therefore preferred to use poly(ethyleneterephthalate) films with a thickness between 40 and 100 μm as the temporary support for the sheet or web material according to the present invention, most preferably poly(ethyleneterephthalate) films with a thickness between 50 and 70 μm are used.

In order to regulate the force necessary to strip said temporary support away, once that a sheet or web material according to the present invention is transferred by the end-user to the final substrate of his choice, a stripping layer can be applied between said temporary support and said ink-receiving layer of a sheet or web material according to this invention.

Said stripping layer may be composed as disclosed in e.g. U.S. Pat. No. 4,482,625 and EP-A 529697, on the condition that no traces of said stripping layer remain on said ink-receiving layer after stripping said temporary support away.

In a preferred embodiment said stripping layer according to the present invention, incorporated between said temporary support and said ink-receiving layer, comprises preferably either an hydroalkylcellulose compound in which alkyl represents a C1 to C6 alkylgroup and/or a polyvinylalcohol/polyvinylacetate mixture. The thickness of said stripping layer is in the range of 0.1 to 4 μm, preferably in the range between 0.5 and 2 μm.

The Ink-Receiving Layer

The ink-receiving layer according to the present invention can be any layer that has been disclosed as useful in the production of ink-receiving layers on transparent or opaque polymer supports adapted for ink-jet printing. Especially those compositions disclosed as useful in the production of ink-receiving layers on transparent or opaque polymer supports adapted for ink-jet printing with water-based inks are preferred.

It is important that the ink-receiving layer, according to the present invention, has a limited thickness. When the ink-receiving layer, according to the present invention is too thick, the danger exists that, when laminating a sheet or web material comprising at least three layers, viz. a temporary support, an ink-receiving layer and an adhesive layer with the adhesive layer onto a final substrate with a certain relief pattern, said ink-receiving layer wipes out the relief pattern present on the final substrate. Therefore the thickness of said ink-receiving layer is preferably lower than. 10 μm, and most preferably said thickness is between 3 μm and 7 μm.

The ink-receiving layers, incorporated in an image-recording member according to the present invention comprise a binder or a mixture of binders. Specific examples of binders and blends of bidders are mentionned in European Application 93 200 250.4, filed on Feb. 1, 1993.

Preferred binders, to be used in an ink-receiving layer according to the present invention, are gelatin, vinylpyrrolidone and polyvinylalcohol or binary or ternary blends of these. Gelatin is thus a particularly preferred material for use in forming the ink-receiving layer of materials according to this invention. Among the reasons is the fact that it forms a clear coating, is readily cross-linked in an easily controllable manner, and is highly absorptive of water-based liquid inks to thereby provide rapid-drying characteristics.

The ink-receiving layer according to this invention is preferably cross-linked to provide such desired features as waterfastness and non-blocking characteristics. The cross-linking is also useful in providing abrasion resistance and resistance to the formation of fingerprints on the element as a result of handling. There are a vast number of known cross-linking agents—also known as hardening agents—that will function to cross-link film forming materials, and they are commonly used in the photographic industry to harden gelatin emulsion layers and other layers of photographic silver-halide elements.

Hardening agents can be used individually or in combination and in free or in blocked form. A great many hardeners, useful for the present invention, are known, including formaldehyde and free dialdehydes, such as succinaldehyde and glutaraldehyde, blocked dialdehydes, active esters, sulfonate esters, active halogen compounds, s-triazines and diazines, epoxides, active olefins having two or more active bonds, active olefins, carbodiimides, isoxazolium salts unsubsituted in the 3-position, esters of 2-alkoxy-N-carboxy-dihydroquinoline, N-carbamoyl and N-carbamoylpyridinium salts, hardeners of mixed function, such as halogen-substituted aldehyde acids (e.g. mucochloric and mucobromic acids), onium substituted acroleins and vinyl sulfones and polymeric hardeners, such as dialdehyde starches and copoly(acroleinmethacrylic acid).

The ink-receiving layers according to this invention preferably contain at least one phosphonium mordanting polymer. In a preferred embodiment of the present invention a copolymer of ethylenically unsaturated monomers containing a phosphonium moiety, co-polymerised with N-vinyl imidazole or 2-methyl-2-vinyl imidazole and optionally other co-polymerisable monomers can be used as mordanting agent in the ink-receiving layer. In a further preferred embodiment a mixture of from 5 to 70% by weight, of a first polymer containing the phosphonium moiety, and obtained by homo- or co-polymerisation of ethylenically unsaturated monomers and from 30 to 95% by weight, of a second polymer, which is free from cationic groups and has been obtained by homo- or co-polymerisation of N-vinyl imidazole or 2-methyl-2-vinyl imidazole and optionally other co-polymerisable monomers, as described in e.g. European Application 93 200 250.4 is used as mordanting agent in the present invention.

The ink-receiving layer according to the present invention may also comprise particulate material and surfactants as described in European Application 93 200 250.4 filed on Feb. 1, 1993.

When the element is intended for viewing in reflection, the ink-receiving layer of the invention may contain a whitening agent. $TiO_2$ (futile or anatase) is preferably used as whitening agent in an amount sufficient to produce in the film element a transmission density to white light of at least 0.05, and preferably 0.3 or higher. Amounts of whitener present in the film element can range from 0.1 to 2.0 $g/m^2$, and preferably from 0.2 to 0.5 $g/m^2$, and most preferably 0.3 $g/m^2$. A slurry of the whitener may be added by batchwise addition or by in-line injection just prior to coating the receptor layer(s) on the support.

The ink-receiving layer of the present invention also preferably comprises a plasticizer, since said ink-receiving layer must remain flexible to accomodate easily an eventual curvature and/or relief of the final substrate onto which the end-user wishes to transfer said ink-receiving layer. Suitable plasticizers, for use in the present invention are e.g. ethylene glycol, dietylene glycol, propylene glycol, polyethylene glycol, glycerol monomethylether, glycerol monochlorohydrin, ethylene carbonate, propylene carbonate, tetrachlorophthalic anhydride, tetrabromophthalicanhydride, urea phosphate, triphenylphosphate, glycerolmonostearate, propylene glycol monostearate, tetramethylene sulfone, n-methyl-2-pyrrolidone, n-vinyl-2-pyrrolidone, and polymer latices with low Tg-value such as polyethylacrylate, polymethylacrylate, etc.

The preferred plasticizers for use in ink-receiving layers according to the present invention, are polyethylene glycol and/or polyethylacrylate in "latex form". By "latex form" is understood a polymer or copolymer that is applied as an aqueous dispersion (latex) of particles of said polymer or copolymer.

The ink-receiving layers of the present invention may additionally comprise different additives which are well known in the art, and include UV-filters and antistatic agents.

The ink-receiving layers of the present invention are preferably coated from a coating solution which comprises at least a non-cellulosic binder or a mixture of compatible non-cellulosic binders, and a pH regulating agent providing to the coating solution a pH-value between 7.5 and 11 as disclosed in European Application 92 203316.2, in order to assure good printing qualities when printed with water-based inks.

The ink-receiving layers of the present invention can also comprise special additives used for tuning the background colour by the end-user. Examples of such ingredients include in-situ reagents that can react with other ingredients in the ink-receiving layer and/or adhesion layer such as leuco dyes or precursors. Also dyes and pigments can be included in the ink-receiving layer of the present invention.

The ink-receiving layer can also consist of a $TiO_2$ and $SiO_2$ filled polyvinylalcohol binder with tetramethylorthosicate (TMOS) or tetraethylorthosilicate (TEOS) crosslinker. Such an ink-receiving layer is particularly suitable for transfer upon a (thick) poly(ethyleneterephthalate) film or an aluminum sheet whereafter the ink-receiving layer can be printed by an ink-jet printing technique to give an offset printing plate.

Although the ink-receiving layers according to the present invention can be printed with any liquid ink comprising a solvent or carrier liquid, dyes or pigments, humectants, organic solvents, detergents, thickeners, preservatives, etc., it is preferred to adapt the ink-receiving layer to the use of water-based inks. The adaptation of the ink-receiving layers according to the present invention to the use of water-based inks is preferably done by the means described in European Applications 92 203316.2 and 93 200250.4.

The Adhesive Layer

The adhesive layer to be used according to the present invention is preferably a thermally activated type and its purpose is to aid in the transfer of the coating composite. In order to assure effective adhesion the adhesive layer contains one or more thermoadhesive polymers chosen from e.g. co(styrene-butylacrylate-methacrylic acid), co(styrene-butylmethacrylate-methacrylic acid), co(vinylidenechloride-methacrylate-itaconicacid), co(methylmethacrylate-butadiene-itaconic acid), polyvinylacetate, co(vinylacetate-ethylene), co(n.butylmethacrylate-i.butylmethacrylate), poly-n.butylmethacrylate, poly-i.butylmethacrylate, co(methylmethacrylate-ethylacrylate), co(vinylacetate-vinyllaurate), co(vinylacetate-vinyllaurate-itaconic acid).

The application on top of an ink-receiving layer of the adhesive layer according to the present invention may be accomplished in several different ways. For example, some adhesives may be coated on top of the ink-receiving layer, from organic solvents which do not have any solubilizing or deleterious effect on the ink-receiving layer.

Other adhesives may be coated from aqueous mixtures. Acrylic copolymers with high acid numbers [CARBOSET 525, a commercial product of B. F. Goodrich] can be applied from an aqueous solution of ammoniumhydroxide.

Alternatively, some adhesives can be coated as aqueous emulsions. Examples of aqueous emulsions include vinylacetate [e.g. MOWILITH 30, a commercial product of Hoechst A.G., vinylacetate copolymers such as MOWILITH DM-6 and DM-22 (Hoechst A.G.) and VINNAPAS E6035, commercially available from Wacker Chemie.

Some adhesives like ELVAX 40-W and 150-W (Du Pont) may be applied by hot melt extrusion.

Instead of coating the adhesive layer directly onto the ink-receiving layer, it is also possible to laminate the adhesive layer on the ink-receiving layer from an intermediate substrate (e.g. a siliconised polyester film), on which it was coated first.

The adhesive layer, coated on top of the ink-receiving layer according to the present invention, may optionally contain other components such as UV-absorbers, optical brighteners, antistatic compositions and plasticisers. Suitable plasticisers include polymeric plasticisers such as RESOFLEX R-296 (Cambridge Industries) or phtalates such as dibutylphtalate and dimethylphtalate).

The adhesive layer in the image-recording member according to this invention, is preferrably thicker than 3 μm but thinner than 10 μm, preferably said adhesive layer has a thickness ($t_{ad}$) such that $5<t_{ad}\leqq 7$ μm. In a preferred embodiment, the dry adhesive layer has a coating weight range between approximately 3 and 35 g/m2.

The adhesive layer in a most preferred embodiment comprises co(vinylacetate-vinyllaurate) in a concentration ranging from 5 to 30 g/m2, with a relative molar ratio of vinylacetate/vinyllaurate between 100/0% and 70/30%, still more preferrably at about 80/20%.

The following examples are presented to illustrate this invention, but are not limiting. In the following examples the sheet or web material comprising at least three layers, viz. a temporary support, an ink-receiving layer and an adhesive layer is termed "image-recording element (IRM)". Once said sheet or web material is laminated with said adhesive layer onto a final substrate, the resulting composite material is termed "final image-recording member (FIRM).

Test Methods

Before using the ink-receiving layers, prepared according to examples 1 to 14 and of comparative examples 1 and 2, the ink-receiving layers were first acclimatised for at least 2 hours at 25° C. and 30% RH, and then a test image was jetted upon it. For the ink application, a Hewlett-Packard DeskJet 500C was used and the ink cartridge (HP51625A) that is normaly delivered with it (having three main colors and where black is generated by an overlay of Yellow, Magenta and Cyan).

The recorded images were evaluated as follows:

1. The optical density (OD) of the three primary colors and black was measured by means of a Macbeth TR-1224 optical densitometer. All density measurements of ink-jet images on ink-receiving layers either coated on or transferred to transparent final substrates were done in transparent mode. When the final substrate was opaque all density measurements were done in reflection mode. In table 1 to 4 the optical densities for yellow (OD_Y), magenta (OD_M), cyan (OD_C) and black (OD_B) are given.
2. The ink absorbency was evaluated as follows: a print-out with several primary colors and black was made, so that there is a big time lap between the different blocks of the colors used. Immediately after finishing this print, a sandwich was made with a conventional Xerographic paper, the sandwich was conducted through a roller pair with constant pressure. After removal of the transparent material the optical density on the paper substrate was measured with a Macbeth TR-1224 optical densitometer. The optical density as a function of block number, i.e. as a function of time, was recorded. From these values a "decay time" was calculated. In tables 1 to 4 the values for ink-absorbency are expressed in seconds. The smaller that value the better.
3. The dot quality was measured by image analysis of a microscopic view of a printed example with a few droplets. Both the surface and the contour quality were determined. The observed quality was scaled between 1 (very good) and 5 (very bad);
4. The lateral diffusion was tested by printing blocks of primary colors and looking at the boundary for the appearance of secondary colors, for instance, the amount of green color that could be observed between a yellow and a cyan block was evaluated between 1 (very good) and 5 (very bad).
5. The waterfastness was tested by first measuring the optical density of a printed sample with different primary colors and black; putting the sample in distilled water of 25° C. for 2, 5, 10 and 30 s; and after drying in the atmosphere measuring the optical density of the treated sample again. The slope of the plot optical density versus log(time in sec) is inversely related to the waterfastness, i.e. the lower the figure, the higher the waterfastness. In tables 1 to 4 the values for waterfastness are the average of the slopes of the optical density versus log(time in sec) plot for each of the three primary colors and black times 100.
6. The lightfastness was tested by first measuring the optical density of a printed sample with different primary colors and black; placing the sample under a Xenon-tube for 16 hours (Xe 1500; Color temperature=5500–6500K; 180 kLux; T<45° C.); and after, this treatment measuring the optical density of the sample again. The remaining optical density is related to the lightfastness. In tables 1 to 4 the values for lightfastness are the remaining densities expressed as a percentage of the original density.
7. The sensitivity to fingerprints was evaluated by giving a value 1 (very good) to 5 (very bad) to samples that were treated manually and analysed visually.
8. The lamination quality of the ink-receiving layer on the final substrate was judged visually. A ranking between 1 (very good) and 5 (very bad) was given.

COMPARATIVE EXAMPLE 1

A polyethylene terephthalate film (PET-100 μm thick with typical photographic subbing layers, used for a better bonding between the PET and the gelatinous layers) was used as the substrate. The composition A was applied to this substrate with a pilot coating machine, so as to give a dry film-coating thickness of 5 μm; chilled at 5° C. for 20 s; and dried at 35° C. and at 30% Relative Humidity (RH) for 120 s.

Composition A (Ink-Receiving Layer)

70 parts of a gelatin with a gel strength higher than 220 g, whereof the viscosity of a 10% aqueous solution of it at 40° C. is higher than 50 mPas and which contains 25 to 30% microgels were mixed with 0.15 parts of diisooctylsulfosuccinate, commercially available through American Cyanamid Co under tradename AEROSOL OT 75. Water was added to give 1000 parts.

The pH of the coating solution was adjusted by the addition of a sodium hydroxyde solution to pH 5,5.

NO adhesive layer was applied on top of the layer coated from composition A.

No lamination to a final support was done, and the ink-receiving layer formed from composition A was used as such for ink-jet printing. (Final ink-receiving material FIRM 1). The qualities of this ink-receiving layer are summarized in table 1.

COMPARATIVE EXAMPLE 2

An adhesive layer according to composition B was coated on top of the ink-receiving layer of comparative example 1 such as to give a dry thickness of 6 μm and dried for 300 sec. at 40° C. and RH=20%. This gave image recording member IRM 1.

Composition B (Adhesive Layer)

200 g of a copolymer of 79% (w/w) vinylacetate, 18% (w/w) vinyllaurate and 3% (w/w) of crotonic acid (VINNAPAS B100/18VL, a commercial product of Wacker Chemie Germany), were dissolved in 1000 ml Methylethyleketone.

Transfer of the Ink-Receiving Layer to the Final Substrate

IRM 1 was laminated with the adhesive layer of composition B upon plain paper in a CODOR LAMIPACKER LPP650, a laminating apparatus available from DORNED BV Netherlands. The laminating speed was 45 cm/min and the laminating temperature 110° C.

It was however not possible to strip the temporary support away, so that the ink-receiving layer could not be used for ink-jet printing.

EXAMPLE 1

A polyethylene terephthalate film (PET-100 μm thick without any subbing- or stripping layer) was used as the temporary substrate. Again the composition A was applied to this substrate with a pilot coating machine, so as to give a dry film-coating thickness of 5 μm; chilled at 5° C. for 20 s; and dried at 35° C. for 120 s (RH=30%). After drying, composition B was applied on top of the layer coated from composition A as described in comparative example 2. This provided the image-recording member IRM 2.

Transfer of the ink-receiving layer to the final substrate

IRM 2 was laminated with the adhesive layer of composition B upon plain paper as described in comparative example 2. After stripping away the temporary support, the ink-receiving layer becomes available for ink-jet printing (FIRM 2).

EXAMPLE 2

An image-recording member as describe in example 1 was prepared except that the ink-receiving layer was coated from composition C, instead of from composition A.

Composition C (Ink-Receiving Layer)

70 parts of gelatin with a gel strength higher than 220 g, whereof the viscosity of a 10% aqueous solution of it at 40° C. is higher than 50 mPas and which contains 25 to 30% microgels were mixed with 25 parts of phenyl-dextraan-carbonate, and 0.25 parts of diisooctylsulfosuccinate, commercially available through American Cyanamid Co under tradename AEROSOL OT 75. Water was added to give 1000 parts. The pH of the coating was adjusted by the addition of a sodium hydroxyde solution to pH 8.0. After drying, composition B was applied, as described in comparative example 2, on top of the layer coated from composition C. This provided the image-recording member IRM 3.

Transfer of the Ink-Receiving Layer to the Final Substrate

IRM 3 was laminated with the adhesive layer of composition B upon plain paper as described in comparative example 2. After stripping away the temporary support, the ink-receiving layer becomes available for ink-jet printing (FIRM 3).

EXAMPLE 3

An image-recording member as describe in example 1 was prepared except that the ink-receiving layer was coated from composition D, instead of from composition A.

Composition D (Ink-Receiving Layer)

60 parts of gelatin with a gel strength higher than 220 g, whereof the viscosity of a 10% aqueous solution of it at 40° C. is higher than 50 mPas and which contains 25 to 30% microgels were mixed with 22 parts of silica, with a specific surface of 280 to 300 m2/g (KIESELSOL 300F, a tradename of Bayer AG; Leverkusen Germany), 5 parts of 4 μm thick polymethylmethacrylate beads, and with 0.25 parts of diisooctylsulfosuccinate, commercially available through American Cyanamid Co under tradename AEROSOL OT 75. Water was added to give 1000 parts. The pH of the coating was adjusted by the addition of a sodium hydroxyde solution to pH 6.0. After drying, composition B was applied, as described in comparative example 2, on top of the layer coated from composition D. This provided the image-recording member IRM 4.

Transfer of the Ink-Receiving Layer to the Final Substrate

IRM 4 was laminated with the adhesive layer of composition B upon plain paper as described in comparative example 2. After stripping away the temporary support, the ink-receiving layer becomes available for ink-jet printing (FIRM 4).

The quality of ink-jetted images on the image-recording materials according to comparative example 1 and examples 1 to 3 are summarized in table 1

TABLE 1

| | Comp. ex 1 | ex 1 | ex 2 | ex 3 |
|---|---|---|---|---|
| OD_Y | 0.58 | 0.84 | 0.90 | 0.87 |
| OD_M | 0.53 | 0.90 | 0.89 | 0.90 |
| OD_C | 1.20 | 1.47 | 1.49 | 1.51 |
| OD_B | 0.78 | 1.09 | 1.14 | 1.14 |
| Ink absorbency | 480 | 438 | 418 | 430 |
| Dot quality | 3 | 3 | 3 | 2 |
| Lateral diffusion | 3 | 3 | 4 | 3 |
| Waterfastness | 322 | 320 | 360 | 310 |
| Lightfastness | 60 | 60 | 61 | 60 |
| Fingerprints | 3 | 2 | 2 | 1 |
| Lamination quality | n.a.* | 1 | 1 | 1 |

*: n.a. means non applicable, since no lamination took place.

It is clear that an ink-receiving layer according to this invention can be transferred from a temporary substrate to a final one without deterioration of the qualities of the prints.

EXAMPLES 4 TO 7

In these examples the temporary substrate of the ink-receiving layers was always a cellulose-triacetate film (CTA 100 μm thick) without any subbing- or stripping layer.

The ink-receiving layers for these examples were applied to this substrate, from coating solutions E to H respectively, with a pilot coating machine, so as to give a dry film-coating thickness of 5 μm; chilled at 5° C. for 20 s; and dried at 35° C. for 120 s (RH=30%).

After drying of the ink-receiving layers, of these examples, an adhesive layer was applied on top of the ink-receiving layers, not by coating but by laminating the adhesive layer which had previously been coated from composition B, as described in comparative example 2, on a siliconized paper (commercially available through PaPier Fabrik Oberschmitten GMBH, Nidda, Germany) after which the silicon paper was stripped away. The adhesive layer from composition B coated on siliconized paper was laminated on top of the ink-receiving layers in a CODOR LAMIPACKER LPP650, an laminating apparatus available from DORNED BV Netherlands. The laminating speed was 45 cm/min and the laminating temperature 110° C.

Composition E (Ink-Receiving Layer for Example 4)

60 parts of gelatin with a gel strength higher than 220 g, whereof the viscosity of a 10% aqueous solution of it at 40° C. is higher than 50 mPas and which contains 25 to 30% microgels were mixed with 17 parts Polyvinylpyrrolidone (LUVISKOL K90, a tradename for polyvinylpyrrolidone with MW 630,000 of BASF AG, Germany), 20 parts of silica, with a specific surface of 280 to 300 m2/g (KIESELSOL 300F, a tradename of Bayer AG, Leverkusen Germany) and with 0.25 parts of diisooctylsulfosuccinate, commercially available through American Cyanamid Co under tradename AEROSOL OT 75. Water was added to give 1000 parts.

The pH of the coating was adjusted by the addition of a sodium hydroxyde solution to pH 6.0. After drying, composition B, which had previously been coated on a silicon paper, was applied on top of the ink-receiving layer coated from composition F by lamination after which the silicon paper was stripped away.

This provided the image-recording member IRM 5.

Transfer of the Ink-Receiving Layer to the Final Substrate

IRM 5 was laminated with the adhesive layer of composition B upon plain paper as described in comparative example 2. After stripping away the temporary support, the ink-receiving layer becomes available for ink-jet printing (FIRM 5).

EXAMPLE 5

A cellulose-triacetate film (CTA 100 μm thick without any subbing- or stripping layer), was used as the temporary substrate. The composition F was applied to this substrate with a pilot coating machine, so as to give a dry film-coating thickness of 5 μm; chilled at 5° C. for 20 s; and dried at 35° C. for 120 s (RH=30%).

Composition F (Ink-Receiving Layer)

60 parts of gelatin with a gel strength higher than 220 g, whereof the viscosity of a 10% aqueous solution of it at 40° C. is higher than 50 mPas and which contains 25 to 30% microgels were mixed with 24 parts Hydroxypropylcellulose and with 0.25 parts of diisooctylsulfosuccinate, commercially available through American Cyanamid Co under tradename AEROSOL OT 75. Water was added to give 1000 parts.

The pH of the coating was adjusted by the addition of a sodium hydroxyde solution to pH 6.0. After drying, composition B, which had previously been coated on a silicon paper, was applied on top of the ink-receiving layer coated from composition F by lamination after which the silicon paper was stripped away. This provided the image-recording member IRM 6.

Transfer of the Ink-Receiving Layer to the Final Substrate

IRM 6 was laminated with the adhesive layer of composition B upon plain paper as described in comparative example 2. After stripping away the temporary support, the ink-receiving layer becomes available for ink-jet printing (FIRM 6).

EXAMPLE 6

A cellulose-triacetate film (CTA 100 μm thick without any subbing- or stripping layer), was used as the temporary substrate. The composition G was applied to this substrate with a pilot coating machine, so as to give a dry film-coating thickness of 5 μm; chilled at 5° C. for 20 s; and dried at 35° C. for 120 s (RH=30%).

Composition G (Ink-Receiving Layer)

69 parts of gelatin with a gel strength higher than 250 g, whereof the viscosity of a 10% aqueous solution of it at 40° C. is higher than 30 mPas and which contains 15 to 20% microgels were mixed with 28 parts Hydroxypropylcellulose, 0.7 parts of 4 μm thick polymethylmethacrylate beads, 0.05 parts of HELIOECHTGELB GRN (a commercial pigment from Bayer AG, Leverkusen, Germany), 0.14 parts HELIOECHTPAPIERSCHWARZ NL (a commercial pigment from Bayer AG, Leverkusen, Germany), with 1.62 parts of saponine and 0.46 parts of iso-octyl-phenylene-$(O—CH_2—CH_2)_8—O—CH_2—COONa$ available from Chem-Y, Germany as AKYPO OP80. Water was added to give 1000 parts.

The pH of the coating was adjusted by the addition of a sodium hydroxyde solution to pH 6.0. After drying, composition B, which had previously been coated on a silicon paper, was applied on top of the ink-receiving layer coated from composition G by lamination after which the silicon paper was stripped away. This provided the image-recording member IRM 7.

Transfer of the Ink-Receiving Layer to the Final Substrate

IRM 7 was laminated with the adhesive layer of composition B upon plain paper as described in comparative example 2. After stripping away the temporary support, the ink-receiving layer becomes available for ink-jet printing (FIRM 7).

EXAMPLE 7

A cellulose-triacetate film (CTA 100 μm thick without any subbing- or stripping layer), was used as the temporary substrate. The composition H was applied to this substrate with a pilot coating machine, so as to give a dry film-coating thickness of 5 μm; chilled at 5° C. for 20 s; and dried at 35° C. for 120 s (RH=30%).

Composition H (Ink-Receiving Layer)

60 parts of gelatin with a gel strength higher than 220 g, whereof the viscosity of a 10% aqueous solution of it at 40° C. is higher than 50 mPas and which contains 25 to 30% microgels were mixed with 6.6 parts of a water/ethanol solution which contains a mixture of Hydrochinon and Dimethylphenidone (78% hydrochinon/22% dimethylphenidone in % w/w), with 0.2 parts of formaldehyde and with 0.9 parts of a fluorosurfactant, with formula $C_7F_{15}COONH_4$ (FC126 a commercial product of MMM, Minesota, U.S.A.). Water was added to give 1000 parts. The pH of the coating was adjusted by the addition of a sodium hydroxyde solution to pH 8.0. After drying, composition B, which had previously been coated on a silicon paper, was applied on top of the ink-receiving layer coated from composition H by lamination after which the silicon paper was stripped away. This provided the image-recording member IRM 8.

Transfer of the Ink-Receiving Layer to the Final Substrate

IRM 8 was laminated with the adhesive layer of composition B upon plain paper as described in comparative example 2. After stripping away the temporary support, the ink-receiving layer becomes available for ink-jet printing (FIRM 8).

Due to the presence of a dye (example 6) or a reactant (example 7) the final image recording media according to example 6 and 7 (FIRM 7 and 8) did show a different background color, compared to example 4 and 5. The example 6 and 7 gave a "newspaper"-look to the final support.

The quality of ink-jetted images on the image-recording materials according examples 4 to 7 are summarized in table 2.

TABLE 2

| | ex 4 | ex 5 | ex 6 | ex 7 |
|---|---|---|---|---|
| OD_Y | 0.91 | 0.82 | 0.69 | 0.78 |
| OD_M | 0.92 | 0.89 | 0.74 | 0.79 |
| OD_C | 1.48 | 1.43 | 1.19 | 1.49 |
| OD_B | 1.11 | 1.10 | 0.92 | 1.08 |
| Ink absorbency | 407 | 421 | 440 | 410 |
| Dot quality | 1 | 1 | 1 | 2 |
| Lateral diffusion | 2 | 3 | 2 | 2 |
| Waterfastness | 280 | 325 | 338 | 308 |
| Lightfastness | 62 | 64 | 66 | 62 |
| Fingerprints | 1 | 1 | 1 | 1 |
| Lamination quality | 2 | 2 | 2 | 1 |

EXAMPLES 8 TO 10

In these examples, the procedure described in example 3 was repeated except for the final substrate to which the ink-receiving layer was transferred.

In example 3 the final substrate was plain paper

In example 8 the final substrate was plain paper, pre-printed by xerographic means.

In example 9 the final substrate is a polyvinylchloride sheet of 210 µm thick

In example 10 the final substrate is an aluminuim sheet, thickness 150 µm, as used in the preparation of printing plates.

In table 3 the description of the qualities of the ink-receiving layer of example 3 are repeated together with the description of the qualities of the ink-receiving layers of examples 8 to 10. The optical densities mentionned in table 3 for examples 8 to 10 have been corrected for the background densities of the respective final supports.

TABLE 3

| | ex 3 | ex 8 | ex 9 | ex 10 |
|---|---|---|---|---|
| OD_Y | 0.87 | 0.73 | 0.74 | 0.74 |
| OD_M | 0.90 | 0.82 | 0.85 | 0.81 |
| OD_C | 1.51 | 1.18 | 1.31 | 1.16 |
| OD_B | 1.14 | 0.98 | 1.02 | 1.01 |
| Ink absorbency | 430 | 428 | 432 | 416 |
| Dot quality | 2 | 1 | 1 | 2 |
| Lateral diffusion | 3 | 1 | 1 | 1 |
| Waterfastness | 310 | 210 | 216 | 228 |
| Lightfastness | 60 | 60 | 56 | 58 |
| Fingerprints | 1 | 1 | 2 | 1 |
| Lamination quality | 1 | 1 | 1 | 1 |

EXAMPLES 11 TO 14

The procedure described in example 3 was repeated except for the fact that between the temporary support and the ink-receiving layer of composition D, a stripping layer was present.

Stripping Layer for Example 11

250 parts of a 10% solution of a polyamide (AMILAN CM8000 available through Toray Ind. Japan in methanol and 50 parts of a 10% solution of polystyrene (RESIN M available through Maruzen Cy. Japan) in mathylcellosolve and 700 parts of water to make 1000 parts of a coating soltution were coated on a poly(ethyleneterephthalate) film (PET 100 µm thick) at 450 mg/m$^2$ and dried for 5 min at 40° C. After drying composition D was coated on top of the stripping layer, and adhesive layer (composition B), as described in comparative example 2, coated on top of the ink-receiving layer of composition D as described in example 3 to give image recording member (IRM 11).

Transfer of the Ink-Receiving Layer to the Final Substrate

IRM 11 was laminated with the adhesive layer of composition B upon plain paper as described in comparative example 2. After stripping away the temporary support, the ink-receiving layer becomes available for ink-jet printing (FIRM 11).

Stripping Layer for Example 12

7.7 parts of hydroxyethylcellulose, available from Hercules under tradename NATROSOL 250G were mixed with 20 parts of heptadecylbenzimidazole disulfonic acid, disodium salt available from Ciba-Geigy, Basel, Switserland under trade name UVON and water was added to make 1000 parts. This solution was coated on a poly (ethyleneterephthalate) film (PET 100 µm thick) to give a dry weight of 100 mg/m$^2$ of hydroxyethylcellulose. The layer was dried at 90° C. for 3 min.

After drying composition D was coated on top of the stripping layer, and adhesive layer (composition B), as described in comparative example 2, coated on top of the ink-receiving layer of composition D as described in example 3 to give IRM 12.

Transfer of the Ink-Receiving Layer to the Final Substrate

IRM 12 was laminated with the adhesive layer of composition B upon plain paper as described in comparative example 2. After stripping away the temporary support, the ink-receiving layer becomes available for ink-jet printing (FIRM 12).

Stripping Layer for Example 13

27 parts of polyvinylalcohol (MW=202,000, degree of hydrolysis: 98%) available from Hoechst, Frankfurt Germany under tradename MOWIOL M56-98 and 6 parts of heptadecylbenzimidazole disulfonic acid, disodium salt available from Ciba-Geigy, Basel, Switserland under trade name UVON and water was added to make 1000 parts. This solution was coated on a poly(ethyleneterephthalate) film (PET 100 µm thick) to give a dry weight of 100 mg/m$^2$ of polyvinylalcohol. The layer was dried at 40° C. for 5 min. After drying composition D was coated on top of the stripping layer, and adhesive layer (composition B), as described in comparative example 2, coated on top of the ink-receiving layer of composition D as described in example 3 to give IRM 13.

Transfer of the Ink-Receiving Layer to the Final Substrate

IRM 13 was laminated with the adhesive layer of composition B upon plain paper as described in comparative example 2. After stripping away the temporary support, the ink-receiving layer becomes available for ink-jet printing (FIRM 13).

Stripping Layer for Example 14

21.8 parts of a copolymer of vinylacetate and crotonic acid in 95/5 proportion, available under tradename MOWILITH CT5 from Hoechst, Frankfurt, Germany, 130 ml of 1N ammonia, and 0.4 parts of

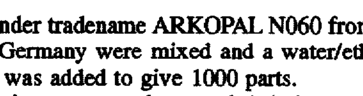

available under tradename ARKOPAL N060 from Hoechst, Frankfurt, Germany were mixed and a water/ethanol mixture (96/4) was added to give 1000 parts.

This solution was coated on a poly(ethyleneterephthalate) film (PET 100 µm thick) to give a dry weight of 50 mg/m$^2$ of copolymer of vinylacetate and crotonic acid in 95/5 proportion. The layer was dried at 120° C. for 2 min.

After drying composition D was coated on top of the stripping layer, and adhesive layer (composition B), as described in comparative example 2, coated on top of the ink-receiving layer of composition D as described in example 3 to give IRM 14.

Transfer of the Ink-Receiving Layer to the Final Substrate

IRM 14 was laminated with the adhesive layer of composition B upon plain paper as described in comparative example 2. After stripping away the temporary support, the ink-receiving layer becomes available for ink-jet printing (FIRM 14).

The description of the qualities of the images ink-jetted on the final image receiving material of example 3 is repeated in table 4, together with the description of the qualities of the images ink-jetted on the final image-receiving materials according to examples 11 tot 14. It is clear that the composition of the stripping layer influences strongly the qualities of the final image-receiving material especially with respect to ink-absorbency and waterfastness

TABLE A

| | ex 3 | ex 11 | ex 12 | ex 13 | ex 14 |
|---|---|---|---|---|---|
| OD_Y | 0.87 | 0.58 | 0.82 | 0.83 | 0.41 |
| OD_M | 0.90 | 0.75 | 0.83 | 0.85 | 0.61 |
| OD_C | 1.51 | 1.07 | 1.19 | 1.31 | 1.24 |
| OD_B | 1.14 | 1.06 | 0.95 | 1.15 | 0.49 |
| Ink absorbency | 430 | 600 | 435 | 441 | 1400 |
| Dot quality | 2 | 4 | 1 | 1 | 3 |
| Lateral diffusion | 3 | 5 | 3 | 2 | 5 |
| Waterfastness | 310 | 900 | 318 | 316 | 1100 |
| Lightfastness | 60 | 60 | 63 | 61 | 59 |
| Fingerprints | 1 | 1 | 2 | 2 | 3 |
| Lamination quality | 1 | 1 | 1 | 1 | 5 |

We claim:

1. A method for inkjet printing on any given substrate comprising the steps of:

i. laminating a sheet or web material comprising at least three layers, including, in consecutive order (a) a temporary support, (b) an ink-receiving layer which comprises at least one binder selected from the group consisting of gelatin, polyvinylpyrrolidone and polyvinylalcohol, wherein said ink-receiving layer comprises a $TiO_2$ and $SiO_2$ filled polyvinylalcohol binder with tetramethylorthosilicate (TMOS) or tetraethylorthosilicate (TEOS) crosslinker and (c) an adhesive layer onto said substrate, via said adhesive layer, ii. stripping the temporary support to free the ink-receiving layer, and iii. applying a water-based ink to said ink-receiving layer by means of ink-jet printing, thus forming an image, wherein during said stripping step, substantially all of the ink-receiving layer remains affixed to the adhesive layer.

2. A method for inkjet printing on any given substrate comprising the steps of:

i. laminating a sheet or web material comprising at least three layers, including, in consecutive order (a) a temporary support, (b) an ink-receiving layer which comprises a polyethylacrylate plasticizer in "latex form" and at least one binder selected from the group consisting of gelatin, polyvinylpyrrolidone and polyvinylalcohol, and (c) an adhesive layer onto said substrate, via said adhesive layer, ii. stripping the temporary support to free the ink-receiving layer, and iii. applying a water-based ink to said ink-receiving layer by means of ink-jet printing, thus forming an image, wherein during said stripping step, substantially all of the ink-receiving layer remains affixed to the adhesive layer.

3. A method for inkjet printing on any given substrate comprising the steps of:

i. laminating a sheet or web material comprising at least three layers, including, in consecutive order (a) a temporary support, (b) an ink-receiving layer which comprises a polyethylacrylate plasticizer in "latex form" and at least one binder selected from the group consisting of gelatin, polyvinylpyrrolidone and polyvinylalcohol, and (c) an adhesive layer comprising a thermoadhesive polymer or copolymer which polymer on copolymer is co(vinylacetate-vinyllaurate) in a concentration ranging from 5 to 30 $g/m^2$, with a relative molar ratio of vinylacetate/vinyllaurate between 100/0 and 70/30, onto said substrate, via said adhesive layer, ii. stripping the temporary support to free the ink-receiving layer, and iii. applying a water-based ink to said ink-receiving layer by means of ink-jet printing, thus forming an image, wherein during said stripping step, substantially all of the ink-receiving layer remains affixed to the adhesive layer.

* * * * *

UNITED STATES PATENT AND TRADEMARK OFFICE

CERTIFICATE OF CORRECTION

PATENT NO. : 5,695,588

DATED : December 9, 1997

INVENTOR(S) : Daems et al.

It is certified that error appears in the above-indentified patent and that said Letters Patent is hereby corrected as shown below:

Title page, Item 54, 3rd line, and Column 1, 3rd line, "SUBSTRACE" should read --SUBSTANCE--;

Column 4, line 38, "bidders" should read --binders--;

Column 5, line 33, "futile" should read --rutile--;

Column 8, line 28, "after, this" should read --after this--.

Signed and Sealed this

Twenty-first Day of July, 1998

Attest:

BRUCE LEHMAN

*Attesting Officer*

*Commissioner of Patents and Trademarks*